(12) United States Patent
Oliver et al.

(10) Patent No.: US 12,704,447 B2
(45) Date of Patent: Aug. 11, 2026

(54) DEVICE AND METHOD TO CALIBRATE OR VERIFY THE DISPLACEMENT-MEASUREMENT SYSTEM OF AN INSTRUMENTED INDENTER

(71) Applicant: KLA Corporation, Milpitas, CA (US)

(72) Inventors: Warren Oliver, Knoxville, TN (US); Jennifer Hay, Farragut, TN (US)

(73) Assignee: KLA Corporation, Milpitas, CA (US)

( * ) Notice: Subject to any disclaimer, the term of this patent is extended or adjusted under 35 U.S.C. 154(b) by 167 days.

(21) Appl. No.: 18/824,665

(22) Filed: Sep. 4, 2024

(65) Prior Publication Data

US 2026/0043728 A1 Feb. 12, 2026

Related U.S. Application Data

(60) Provisional application No. 63/681,150, filed on Aug. 9, 2024.

(51) Int. Cl.
*G01N 3/62* (2006.01)
*G01N 3/317* (2006.01)

(52) U.S. Cl.
CPC ............... *G01N 3/62* (2013.01); *G01N 3/317* (2013.01); *G01N 2203/0082* (2013.01)

(58) Field of Classification Search
CPC .. G01N 3/62; G01N 3/317; G01N 2203/0082; G01N 3/068; G01N 3/42
See application file for complete search history.

(56) References Cited

U.S. PATENT DOCUMENTS 5,357,786 A * 10/1994 Lung ........................ G01N 3/42 73/81
7,685,869 B2 * 3/2010 Bonilla ................ G01Q 60/366 73/105
10,288,540 B1 5/2019 Hay
(Continued)

FOREIGN PATENT DOCUMENTS

FR 2619620 A1 * 2/1989 ............. G01N 13/00
JP 2004012178 A 1/2004
(Continued)

OTHER PUBLICATIONS

WIPO, Search Report for PCT/US2025/040807, Dec. 2, 2025.

*Primary Examiner* — Mohamed K Amara
(74) *Attorney, Agent, or Firm* — Hodgson Russ LLP

(57) ABSTRACT

An optical detector determines a relative depth between a first position and a second position on an inclined surface. A controller determines a slope of the inclined surface based on the relative depth between the first position and the second position and the distance moved between positions. An actuator displaces a punch at a plurality of intermediate positions on the inclined surface located between the first position and the second position. A displacement detector determines a depth at which the sample is touched by the punch at each of the plurality of intermediate positions. The controller further determines a calculated depth of the inclined surface at each of the plurality of intermediate positions based on the slope of the inclined surface and the distance moved between positions. The controller further compares the depth measured by the displacement detector to each corresponding calculated depth to verify accuracy of the displacement detector.

20 Claims, 6 Drawing Sheets

(56) References Cited

U.S. PATENT DOCUMENTS

| | | | | |
|---|---|---|---|---|
| 2009/0076743 | A1* | 3/2009 | Moseson | G01N 3/42<br>702/42 |
| 2014/0268172 | A1 | 9/2014 | Salehpour et al. | |
| 2015/0068292 | A1* | 3/2015 | Su | G01N 3/46<br>73/82 |
| 2015/0079398 | A1* | 3/2015 | Amin | C01B 21/072<br>423/325 |
| 2017/0074765 | A1* | 3/2017 | Koshimizu | G01N 3/42 |
| 2017/0108420 | A1* | 4/2017 | Burns | G01N 3/42 |
| 2017/0370895 | A1* | 12/2017 | Han | G01N 3/42 |
| 2019/0154556 | A1* | 5/2019 | Beyeler | G01Q 60/366 |
| 2020/0033117 | A1 | 1/2020 | Huang | |
| 2024/0162074 | A1 | 5/2024 | Rachinayani et al. | |

FOREIGN PATENT DOCUMENTS

| | | | | |
|---|---|---|---|---|
| KR | 20100126673 A | * | 12/2010 | G01N 3/42 |
| KR | 102227298 B1 | * | 3/2021 | C03C 17/225 |

* cited by examiner

DEVICE AND METHOD TO CALIBRATE OR VERIFY THE DISPLACEMENT-MEASUREMENT SYSTEM OF AN INSTRUMENTED INDENTER

CROSS-REFERENCE TO RELATED APPLICATIONS

This application claims priority to the provisional patent application filed Aug. 9, 2024, and assigned U.S. App. No. 63/681,150, the disclosure of which is hereby incorporated by reference.

FIELD OF THE DISCLOSURE

This disclosure relates to instrumented indentation systems for displacement measurement and testing for research, development, and manufacturing of semiconductor devices.

BACKGROUND OF THE DISCLOSURE

Evolution of the manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a manufacturer.

As an example of manufacturing challenges, fabricating semiconductor devices, such as logic and memory devices, typically includes processing a sample, such as a semiconductor wafer, using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Metrology processes are used at various steps during semiconductor manufacturing to monitor and control the process. Metrology processes are different than inspection processes in that, unlike inspection processes in which defects are detected on wafers, metrology processes are used to measure one or more characteristics of the wafers that cannot be determined using existing inspection tools. Metrology processes can be used to measure one or more characteristics of wafers such that the performance of a process can be determined from the one or more characteristics. For example, metrology processes can measure a dimension (e.g., line width, thickness, etc.) of features formed on the wafers during the process. In addition, if the one or more characteristics of the wafers are unacceptable (e.g., out of a predetermined range for the characteristic(s)), the measurements of the one or more characteristics of the wafers may be used to alter one or more parameters of the process such that additional wafers manufactured by the process have acceptable characteristic(s).

The simplest and most common macro-scale mechanical test is the tensile (or compression) test. In this test, a sample of uniform cross section is stretched (or compressed) uniaxially while the resulting deformation of the sample is continuously monitored. The stress $\sigma$ is defined as the force applied to the sample divided by the cross-sectional area of the sample, and the strain & is defined as the change in length of the sample divided by the original length. The strain increases in proportion to the stress while the deformation remains elastic, with the constant of proportionality being the Young's Modulus of the material, E. The onset of plasticity is identified as the yield point, or the point at which the strain begins to increase disproportionately to the stress. Beyond the yield point Y, a variety of micro-structural mechanisms determine the relation between stress and strain; these include dislocation motion and entanglement, grain boundary sliding, micro-fracturing, etc.

Standardized instrumented indentation can be used to determine the Young's modulus as well as the hardness of a small volume of material using a nanoindenter. Periodic verification of the accuracy of the displacement measurements reported by the nanoindenter may be required by industrial standards such as ISO 14577-2 and ASTM 2546. These industrial standards specify the requirements for range, traceability, repeatability, accuracy, reporting, and how often the verification must be done, but the standards do not specify the device nor process.

Displacement-verification of a nanoindenter requires that the tip of the indenter move some relative distance which is both A) reported by the nanoindenter and B) known by independent means. Generally, this process is done for a range of lengths, and it is repeated multiple times for each length. The values reported by the nanoindenter must match the corresponding independent values to a satisfactory degree, as specified by standards or set by manufacturing controls driven by market expectations. Thus, the "verification device" must provide a way of independently knowing the lengths realized and reported by the nanoindenter.

There are many ways to independently know a length even at the microscopic scale. Step-height standards are available having microscopic steps, the heights of which are traceably known. For example, the nanoindenter could touch the top of one such step, then the bottom, and the height difference reported by the nanoindenter could be compared with the known step height. However, different ranges of step heights may be needed for verification of a nanoindenter used in different application. Alternatively, a laser interferometer could be used to independently measure the motion of the nanoindenter, but interferometers are expensive and difficult to deploy for verification of nanoindenters in the field. In other examples, a piezo, screw-driven, or similar actuating device could be used to engage the nanoindenter tip and push it up by various lengths, and the pushing device itself could be traceably calibrated by a laser interferometer, but this method is also expensive and complex. In further examples, the nanoindenter could engage and push a platform suspended by springs of known stiffness, where the motion of the nanoindenter can be derived from as the reported force divided by the spring stiffness. However, this method conflates force and displacement, and it relies on an approximation of the spring stiffness which can vary depending on environmental temperature and pressure.

Therefore, what is needed is an improved method and device for displacement verification of an instrumented indenter.

BRIEF SUMMARY OF THE DISCLOSURE

An embodiment of the present disclosure provides a system. The system may comprise a stage configured to support a sample and move the sample within an X-Y plane; an indenter including a punch having a longitudinal axis normal to the X-Y plane; an actuator coupled to the support and/or the indenter and configured to cause displacement of the punch relative to the support in a direction substantially parallel to the longitudinal axis of the punch; a force detector configured to output data representative of an applied force corresponding to mechanical response of the sample as a reaction to being contacted by the punch; a displacement detector configured to output data representative of a depth at which the sample is touched by the punch; an optical detector configured to output data representative of a relative depth between two or more positions of the sample; and a controller in electronic communication with the actuator, the force detector, the displacement detector, and the optical detector. The controller may be configured to control the displacement of the punch relative to the support and the force applied by the punch to the sample and receive the data output by the force detector, the displacement detector, and optical detector.

The sample may include an inclined surface. The inclined surface may be inclined in an X-direction of the X-Y plane.

The optical detector may be configured to detect a relative depth between a first position and a second position on the inclined surface. The first position and the second position may be offset in the X-direction of the inclined surface by a distance moved by the stage. The controller may be further configured to determine a slope of the inclined surface based on the relative depth between the first position and the second position and the distance moved by the stage from the first position to the second position.

The displacement detector may be configured to detect a depth at which the sample is touched by the punch at a plurality of intermediate positions on the inclined surface. The plurality of intermediate positions may be located between the first position and the second position in the X-direction. The controller may be further configured to determine a calculated depth of the inclined surface at each of the plurality of intermediate positions based on the slope of the inclined surface and the distance moved by the stage and compare the depth measured by the displacement detector at each of the plurality of intermediate positions to each corresponding calculated depth to verify accuracy of the displacement detector.

In some embodiments, the sample may further include a first planar surface and a second planar surface. The longitudinal axis of the indenter may be normal to the first planar surface and the second planar surface. The first planar surface and the second planar surface may have different relative depths along the longitudinal axis.

The optical detector may be configured to detect a relative depth between the first planar surface and the second planar surface. The controller may be configured to compare the relative depth between the first planar surface and the second planar surface to a known depth to verify accuracy of the optical detector.

In some embodiments, the first planar surface may be offset from the second planar surface in the X-direction of the X-Y plane.

In some embodiments, the inclined surface may be offset from the first planar surface and the second planar surface in a Y-direction of the X-Y plane.

In some embodiments, the relative depth between the first planar surface and the second planar surface may be in a range of 1 mm to 10 mm.

In some embodiments, the relative depth between the first planar surface and the second planar surface may be greater than the relative depth between the first position and the second position on the inclined surface.

In some embodiments, a first reference substrate may be disposed on the first planar surface and a second reference substrate may be disposed on the second planar surface. The optical detector may be configured to detect the relative depth between the first reference substrate and the second reference substrate.

In some embodiments, the first reference substrate and the second reference substrate may comprise silica disks.

In some embodiments, the controller may be configured to compare the relative depth between the first planar surface and the second planar surface to the known depth to verify the accuracy of the optical detector based on a formula of:

$$|(z_{ref1} - z_{ref2}) - z_{known}| \le t_{ref}$$

where $z_{ref1}$ is a depth of the first planar surface detected by the optical detector, $z_{ref2}$ is a depth of the second planar surface detected by the optical detector, $z_{known}$ is the known depth between the first planar surface and the second planar surface, and $t_{ref}$ is a preset reference threshold.

In some embodiments, a test substrate may be disposed on the inclined surface. The displacement detector may be configured to detect a depth at which the test substrate is touched by the punch at the first position, the second position, and the plurality of intermediate positions on the inclined surface.

In some embodiments, the test substrate may comprise a microscope slide.

In some embodiments, the slope of the inclined surface may be in a range of 0.01 to 0.1.

In some embodiments, the controller may be configured to determine the slope of the inclined surface based on a formula of:

$$m = \frac{z_2 - z_1}{x_2 - x_1}$$

where m is the slope of the inclined surface, $z_1$ is a depth detected by the optical detector at the first position, $x_1$ is a position of the stage in the X-direction at the first position, $z_2$ is a depth detected by the optical detector at the second position, and $x_2$ is a position of the stage in the X-direction at the second position.

In some embodiments, the controller may be configured to determine the calculated depth of the inclined surface at each of the plurality of intermediate positions based on a formula of:

$$c_n = mx_n$$

where $c_n$ is the calculated depth of the inclined surface at an nth one of the plurality of intermediate positions, and $x_n$ is a position of the stage in the X-direction at the nth one of the plurality of intermediate positions.

In some embodiments, the controller may be configured to compare the depth measured by the displacement detector at each of the plurality of intermediate positions to each corresponding calculated depth to verify the accuracy of the displacement detector according to a formula of:

$$|c_n - d_n| \leq t$$

where $d_n$ is a depth measured by the displacement detector at the nth one of the plurality of intermediate positions, and t is a preset error threshold.

In some embodiments, the optical detector may comprise a laser interferometer.

Another embodiment of the present disclosure provides a method. The method may comprise determining, with an optical detector, a relative depth between a first position and a second position on an inclined surface of a sample. The sample may be supported by a stage and movable within an X-Y plane. The inclined surface may be inclined in an X-direction of the X-Y plane. The first position and the second position may be offset in the X-direction of the inclined surface by a distance moved by the stage.

The method may further comprise determining, with a controller, a slope of the inclined surface based on the relative depth between the first position and the second position and the distance moved by the stage from the first position to the second position.

The method may further comprise displacing, with an actuator, a punch of an indenter in a direction substantially parallel to a longitudinal axis of the punch at a plurality of intermediate positions on the inclined surface while moving the stage in the X-direction. The longitudinal axis may be normal to the X-Y plane. The plurality of intermediate positions may be located between the first position and the second position in the X-direction.

The method may further comprise determining, with a displacement detector, a depth at which the sample is touched by the punch at each of the plurality of intermediate positions.

The method may further comprise determining, with the controller, a calculated depth of the inclined surface at each of the plurality of intermediate positions based on the slope of the inclined surface and the distance moved by the stage for each of the plurality of intermediate positions.

The method may further comprise comparing, with the controller, the depth measured by the displacement detector at each of the plurality of intermediate positions to each corresponding calculated depth to verify accuracy of the displacement detector.

In some embodiments, before determining, with the optical detector, the relative depth between the first position and the second position on the inclined surface of the sample, the method may further comprise determining, with the optical detector, a relative depth between a first planar surface and a second planar surface of the sample. The longitudinal axis of the indenter may be normal to the first planar surface and the second planar surface. The first planar surface and the second planar surface may have different relative depths along the longitudinal axis. The method may further comprise comparing, with the controller, the relative depth between the first planar surface and the second planar surface to a known depth to verify accuracy of the optical detector.

In some embodiments, before determining, with the optical detector, the relative depth between the first position and the second position on the inclined surface of the sample, the method may further comprise providing the sample and disposing the sample on the stage.

In some embodiments, the method may further comprise calibrating, with the controller, output signals received from a digital voltmeter of the displacement detector of the depth measured at each of the plurality of intermediate positions with each corresponding calculated depth.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Figure 1:
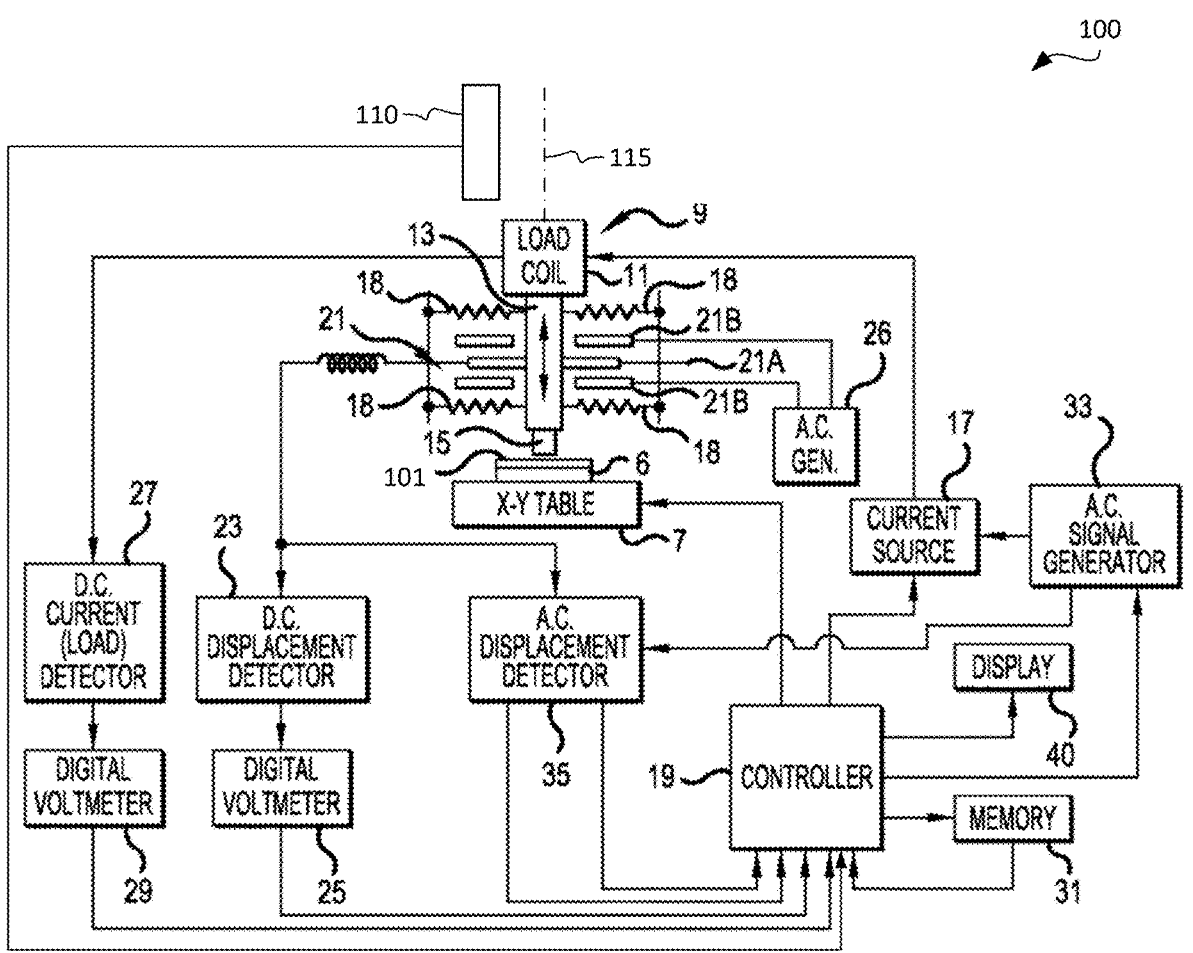
FIG. 1 is a schematic diagram of a system according to an embodiment of the present disclosure.

An embodiment of the present disclosure provides a system 100, as shown in FIG. 1. The system 100 may be a metrology system, configured to ascertain a property of material. For example, the system 100 may be configured to obtain force-displacement data from a sample 101 and calculate values of stress and strain from that data. Thus, a mechanical property or properties of the material (e.g., its hardness and/or yield point) of the sample 101 can in turn be determined.

The system 100 may comprise a support 6 configured to support the sample 101 across its bottom. In an instance, the sample 101 may be in the form of a thin plate of material and the support 6 can support the entire bottom surface of the sample 101. In some embodiments, the dimensions of the sample 101 (e.g., the thickness of the sample) may be on the order of nanometers.

The system 100 may further comprise a stage 7 to which the support 6 can be mounted or is fixed such that the sample 101 cannot deflect relative to the stage. The stage 7 may constitute an X-Y stage so that the sample 101 can be located in a known position in an X-Y plane. The apparatus also has a system controller 19 which may be operatively connected to the X-Y stage 7 to control the movements of the stage in an X-Y plane along the X and Y axes.

In some embodiments, the system 100 may be provided such that the surface of the sample 101 to be engaged faces up. Alternatively, the system 100 may be configured so that the surface of the sample 101 to be engaged faces downwardly. In either of these cases, the X-Y plane may be a horizontal plane. As another alternative, the system 100 could be configured so that the surface of the sample 101 to be engaged faces to the side. In this case, the X-Y plane could be a vertical plane. As used herein, X and Y represent any two axes of a Cartesian coordinate system and is not limited to a particular planar orientation.

The system 100 may further comprise an indenter punch 15 provided along a longitudinal axis 115 (Z axis) orthogonal to the X-Y plane above the stage 7 and above the sample 101 supported on the stage 7. The indenter punch 15 may be displaceable relative to the support 6 along the longitudinal axis 115 (in the directions shown by the double-headed arrow in FIG. 1) so as to apply a load to the sample 101. Such relative movement can be caused by movement of the indenter punch 15, movement of the support 6, or movement of both the indenter punch 15 and the support 6. An actuator 9 coupled to the support 6 and/or indenter can be provided to cause such relative movement. The actuator 9 may be operative to apply a force to the sample 101, through the indenter punch 15, which is on the order of milliNewtons (mN). The actuator 9 can be a hydraulic, pneumatic, magnetic and/or electric (e.g. electrostatic, electromagnetic, and/or piezoelectric) actuator. The controller 19 may be operatively connected to the actuator 9 to control the relative movement between the support 6 and the indenter punch 15.

The actuator 9 may comprise a current driven load coil 11 and a variable current source 17 controlled by controller 19 to supply electrical current to the coil 11. In this way, a rod 13 of the indenter can be controlled to move downward such that an end surface of the indenter punch 15 is brought into direct engagement, i.e., contact, with the sample 101. The actuator 9 may include leaf springs 18 which constrain the rod 13 such that the indenter punch 15 can moves only along the longitudinal axis 115. Once the end surface of the indenter punch 15 contacts the sample 101, a force and/or displacement pattern is exerted on the indenter by varying the current supplied to the load coil 11 according to a program provided by the controller 19. The force and/or displacement pattern can include a loading pattern that forces the indenter punch 15 into the sample 101, and an unloading pattern that subsequently withdraws the indenter punch 15 from the sample 101. Force-displacement responses can be obtained during this loading and unloading of the sample 101, and the responses can be used by the controller 19 to calculate values of stress and strain of the sample 101.

The system 100 may further comprise a displacement detector 21 configured to detect a depth to which the sample 101 has been penetrated by the indenter punch 15, and a force detector configured to monitor the force applied to the sample 101 by the indenter punch 15, and thus detect a mechanical response of the sample 101 as a reaction to being touched by the indenter punch 15. The displacement detector 21 may also be configured to output data representative of the penetration depth to the controller 19 and likewise, the force detector may also be configured to output data representative of the force applied to the sample to the controller 19.

The displacement detector 21 may comprise a sensor that is configured to sense displacement of the rod 13 and hence, of the indenter punch 15, and output signals that are measures of the displacement, and a converter (D.C. displacement detector) 23 that is connected to the sensor and controller 19 and is configured to digitalize signals from the sensor and issue the signals to the controller 19. The system 100 may also include a digital voltmeter 25 to which the digital signals from the converter 23 are fed to the controller 19. In this case, the voltmeter 25 can provide a calibrated readout of the displacement of the indenter punch 15 to an operator during testing procedures.

In some embodiments, the sensor may be a capacitive displacement gage including a center plate 21A connected to an AC source 26. The center plate 21A may be coupled to the rod 13 to move therewith. The drive plates 21B may have apertures through which rod 13 extends freely, such that the center plate 21A moves relative to drive plates 21B. The capacitance between the center plate 21A and drive plates 21B may be indicative of the relative position of rod 13, which corresponds to the displacement of the indenter punch 15 relative to the sample 101. Springs 18 may be provided separate from the center plate 21A and directly connected to the rod 13 to limit lateral movement of the rod 13. Alternatively, the springs 18 could be connected directly to the center plate 21A.

In other embodiments, the displacement detector may be of another type of sensor, such as a type based on electromagnetic radiation such as laser interferometers, fiber optic-based sensors or radar, magnetically based or other forms of electric based sensors such as strain gages. In addition, any form of sensor used in or suitable for an atomic force microscope could be used.

The force detector may comprise a DC current detector 27 operatively connected to the load coil 11 to sense the DC drive current flowing through the load coil 11. The detector 27 may be configured to digitalize the DC drive current and output the digital signals to the controller 19. The system 100 may include a second digital voltmeter 29 through which the signals are fed to the controller 19 and which provides a calibrated readout to an operator of the force of the indenter punch 15 exerted on the sample 101 during testing procedures.

The system 100 may further comprise a memory 31 in which data, and system operating parameters and/or programs, are stored. The memory 31 may be a unit separate from the controller 19 or may be an integral component of the controller 19 along with a processor. The configuration of the controller 19 will be described in more detail below.

The controller 19 may include a microprocessor, a microcontroller, or other devices. The controller 19 may be coupled to the components of the system 100 in any suitable manner (e.g., via one or more transmission media, which may include wired and/or wireless transmission media) such that the controller 19 can receive output. The controller 19 may be configured to perform a number of functions using the output. An inspection tool can receive instructions or other information from the controller 19. The controller 19 optionally may be in electronic communication with another inspection tool, a metrology tool, a repair tool, or a review tool (not illustrated) to receive additional information or send instructions.

The controller 19 may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The controller 19 may be disposed in or otherwise part of the system 100 or another device. In an example, the controller 19 may be part of a standalone control unit or in a centralized quality control unit. Multiple controllers 19 may be used, defining multiple subsystems of the system 100.

The controller 19 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 19 to implement various methods and functions may be stored in readable storage media, such as a memory.

If the system 100 includes more than one subsystem, then the different controllers 19 may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The controller 19 may be configured to perform a number of functions using the output of the system 100 or other output. For instance, the controller 19 may be configured to send the output to an electronic data storage unit (e.g., memory 31) or another storage medium. The controller 19 may be further configured as described herein.

The controller 19 may be configured according to any of the embodiments described herein. The controller 19 also may be configured to perform other functions or additional steps using the output of the system 100 or using images or data from other sources.

The controller 19 may be communicatively coupled to any of the various components or sub-systems of system 100 in any manner known in the art. Moreover, the controller 19 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the controller 19 and other subsystems of the system 100 or systems external to system 100. Various steps, functions, and/or operations of system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link. For instance, the various steps described throughout the present disclosure may be carried out by a single controller 19 (or computer subsystem) or, alternatively, multiple processors 160 (or multiple computer subsystems). Moreover, different sub-systems of the system 100 may include one or more computing or logic systems. Therefore, the above description should not be interpreted as a limitation on the present disclosure but merely an illustration.

Using the system 100, a sample 101 of test material mounted to support 6 is positioned at a known location via the X-Y table 7 and the controller 19 is signaled to start the test procedure. In response, the indenter punch 15 and the sample are brought together, e.g., the indenter punch 15 is lowered, at a slow rate until the end surface of the indenter punch 15 contacts the surface of the sample 101. At this time, the surface of the portion of the sample 101 to be directly engaged may be substantially parallel to the end surface of the indenter punch 15. Then the controller 19 can execute a loading pattern. For example, the controller 19 can control the current source 17 to supply an increasing DC current to the load coil 11 of the actuator 9 such that the actuator 9 forces the end surface of the indenter punch 15 further towards and into the sample 101 (along the direction of the longitudinal axis 115) until a predetermined (target) force or displacement is reached. The force or displacement can be static or vary over time either increasing or decreasing such as according to a selected ramping function. Then the controller 19 can execute an unloading pattern. As a result, the indenter punch 15 is withdrawn from the sample 101 with the same or similar pattern of force or displacement.

During at least the loading and unloading steps, the controller 19 can monitor the force applied by the indenter as measured by the DC current detector 27 and the displacement of the indenter punch 15 as measured by the DC displacement detector 23. Other dynamic channels may also be recorded simultaneously. Respective values of this data may be stored in the memory 31.

The system 100 may further comprise an AC signal generator 33 under control of the controller 19 to introduce an AC signal into the output current signal of the current source 17 and an AC displacement detector 35 for detecting the resulting AC displacement. The AC displacement detector 35 may be a lock-in amplifier which is tuned to measure the amplitude of the AC displacement at the applied frequency together with the phase of the displacement signal relative to the applied signal. The amplitude and phase signals are digitalized by the detector 35 and fed to separate inputs of the controller 19 for analysis or storage (in memory 31) along with the DC force and displacement information during the loading and unloading pattern parts of the process program. The force-displacement response data can be provided as an output for use in ascertaining one or more mechanical properties of the material that the sample 101 is made from. Alternatively, controller 19 can perform the necessary calculations using the data and provide the one or more mechanical properties as an output. In any case, the controller 19 may be configured to calculate values of stress $\varepsilon$ and strain $\sigma$ from points of data of the force and displacement. A stress-strain curve can then be produced (constructed) using the force-displacement data. The system 100 may include a display 40 that displays the stress-strain curve. The stress-strain curve may be used to determine at least one mechanical property of sample 101 such as the yield point, hardness, etc.

The system 100 may further comprise an optical detector 110 configured to output data representative of a relative depth between two or more positions of the sample 101. In some embodiments, the optical detector 110 may be a laser interferometer or any kind of non-contact microscope (e.g., optical microscope, scanning electron microscope, transmission electron microscope, optical profiler, etc.). The controller 19 may be in electronic communication with the optical detector 110 to receive the data output by the optical detector 110.

Figure 2:
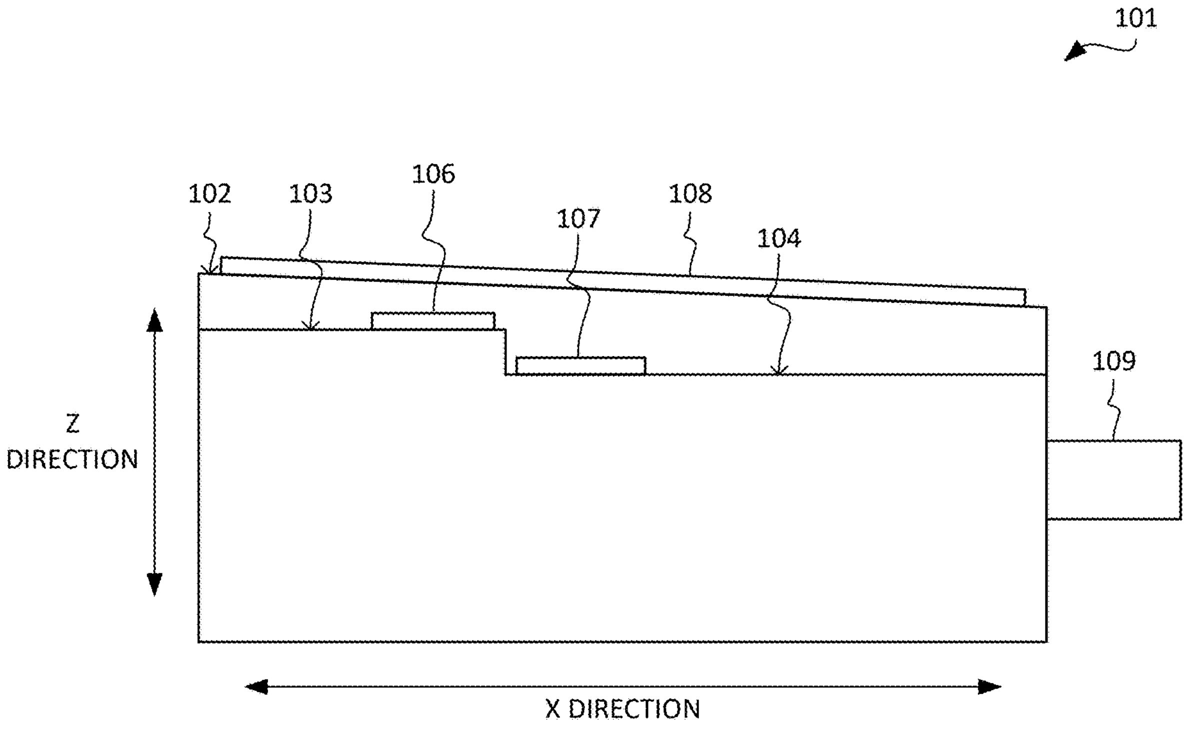
FIG. 2 is a side view of a verification device according to an embodiment of the present disclosure.
Figure 3:
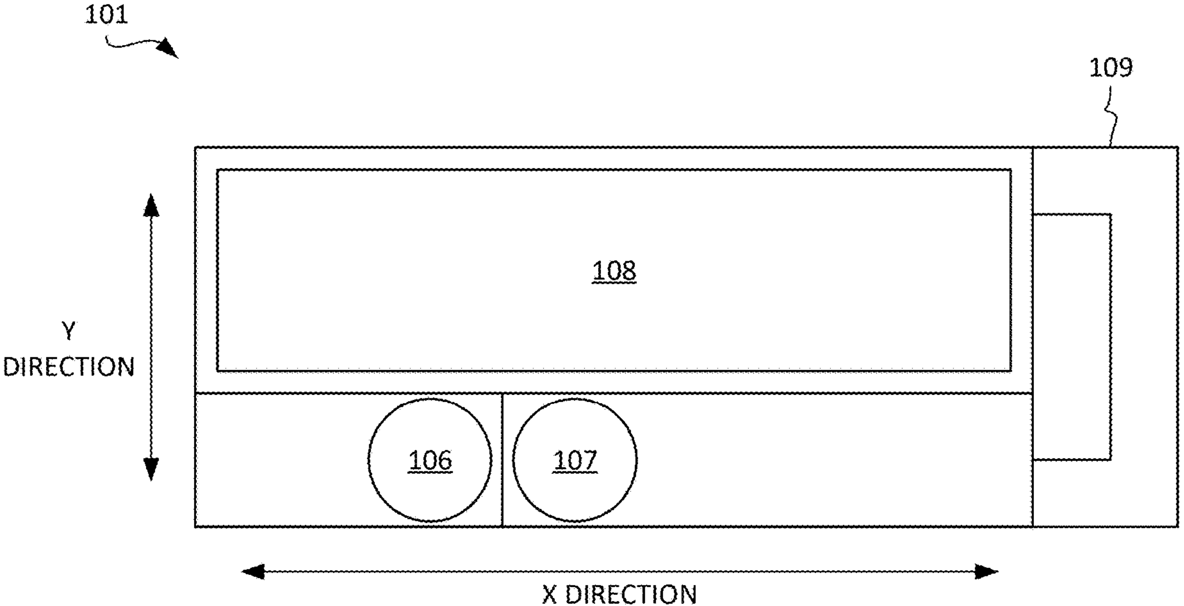
FIG. 3 is a top view of the verification device of FIG. 2.

According to an embodiment of the present disclosure, the sample 101 may be a device for verification and/or calibration of the elements of the system 100. As shown in FIG. 2 and FIG. 3, the sample 101 may include an inclined surface 102. The inclined surface 102 may be inclined in the X-direction of the X-Y plane. The inclined surface 102 may have a slope within a range of 0.01 to 0.1, which may be positive or negative. For example, the slope of the inclined surface 102 may be ±0.03. The sample 101 may further include a first planar surface 103 and a second planar surface 104. The longitudinal axis 115 of the indenter 15 (shown in FIG. 1) may be normal to the first planar surface 103 and the second planar surface 104. In some embodiments, the first planar surface 103 may be offset from the second planar surface 104 in the X-direction of the X-Y plane. In some embodiments, the inclined surface 102 may be offset from the first planar surface 103 and the second planar surface 104 in the Y-direction of the X-Y plane. The first planar surface 103 and the second planar surface 104 may have different relative depths along the longitudinal axis 115. For example, the relative depth between the first planar surface 103 and the second planar surface 104 may be in a range of 1 mm to 10 mm. In an instance, the relative depth between the first planar surface 103 and the second planar surface 104 may be 5 mm.

In some embodiments, a first reference substrate 106 may be disposed on the first planar surface 103, and a second reference substrate 107 may be disposed on the second planar surface 104. The first reference substrate 106 and the second reference substrate 107 may present a smooth, flat, and highly polished surface for focus by the optical detector 110, as further described below. For example, the first reference substrate 106 and the second reference substrate 107 may comprise fused silica disks, highly polished aluminum, or other materials. In some embodiments, a test substrate 108 may be disposed on the inclined surface 102. The test substrate 108 may comprise, for example, a microscope slide. In some embodiments, the sample 101 may further include a handle 109 defined on a side surface. The handle 109 may be engaged by a handling device, such as an end effector (not shown), to removably dispose the sample 101 (which may be defined as a sample tray) on the stage 7.

Using the sample 101 as a verification device, displacement measurements of the system 100 may be verified and/or calibrated as follows.

Figure 4A:
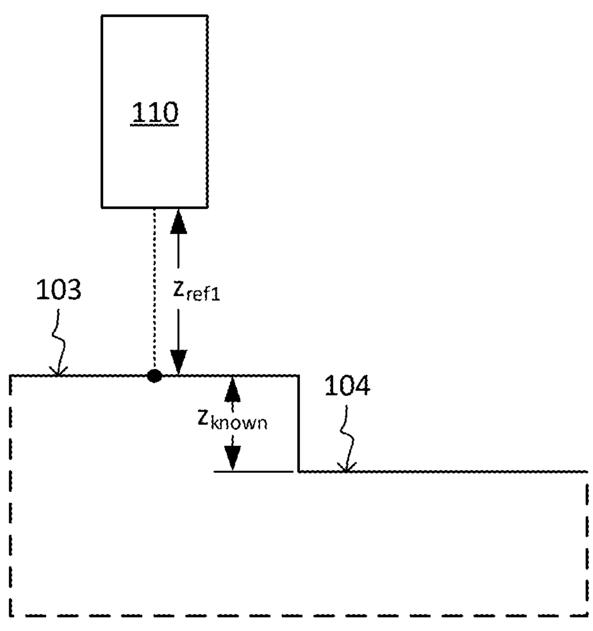
FIG. 4A is a side view of an optical detector measuring a depth of a first planar surface of a verification device according to an embodiment of the present disclosure.
Figure 4B:
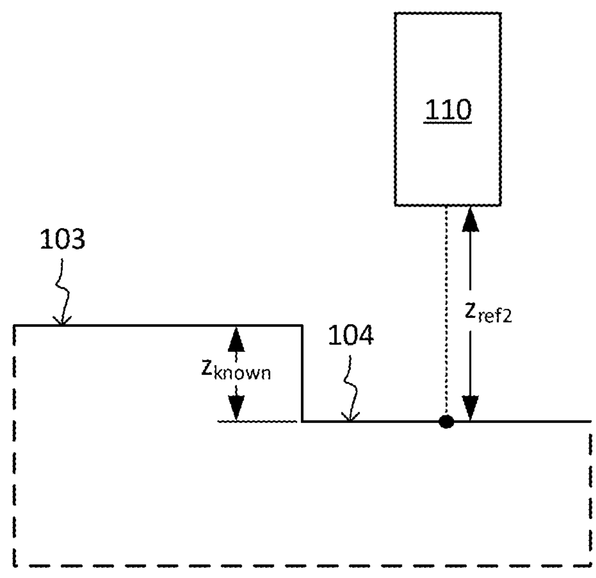
FIG. 4B is a side view of the optical detector measuring a depth of a second planar surface of the verification device of FIG. 4A.

The optical detector 110 may be configured to detect a relative depth between the first planar surface 103 and the second planar surface 104 of the sample 101, as shown in FIG. 4A and FIG. 4B. The stage 7 may move in the X-direction in order for the optical detector 110 to detect each of the first planar surface 103 and the second planar surface 104. In some embodiments, the optical detector 110 may be configured to detect the relative depth between the first reference substrate 106 and the second reference substrate 107. The controller 19 may be configured to compare the relative depth between the first planar surface 103 and the second planar surface 104 to a known depth to verify accuracy of the optical detector 110. For example, the controller 19 may be configured to compare the relative depth between the first planar surface 103 and the second planar surface 104 to the known depth to verify the accuracy of the optical detector 110 based on a formula of:

$$|(z_{ref1} - z_{ref2}) - z_{known}| \leq t_{ref}$$

where $z_{ref1}$ is a depth of the first planar surface 103 detected by the optical detector 110, $z_{ref2}$ is a depth of the second planar surface 104 detected by the optical detector 110, $z_{known}$ is the known depth between the first planar surface 103 and the second planar surface 104, and $t_{ref}$ is a preset reference threshold. The known depth may be established when manufacturing the sample 101. For example, if $z_{known}$ is 5 mm, the preset reference threshold $t_{ref}$ may be set to 10 μm, so that the error in the reference lengths may be less than 10 nm according to industrial standards (e.g., ISO 14577-2, ASTM 2546, or the like). With the accuracy of the optical detector 110 verified, the optical detector 110 can be used to verify the accuracy of the displacement detector 21. In some embodiments, the accuracy of the optical detector 110 may be pre-verified, and the optical detector 110 can be immediately used to verify the accuracy of the displacement detector 21 without separate verification, as further described below.

Figure 5A:
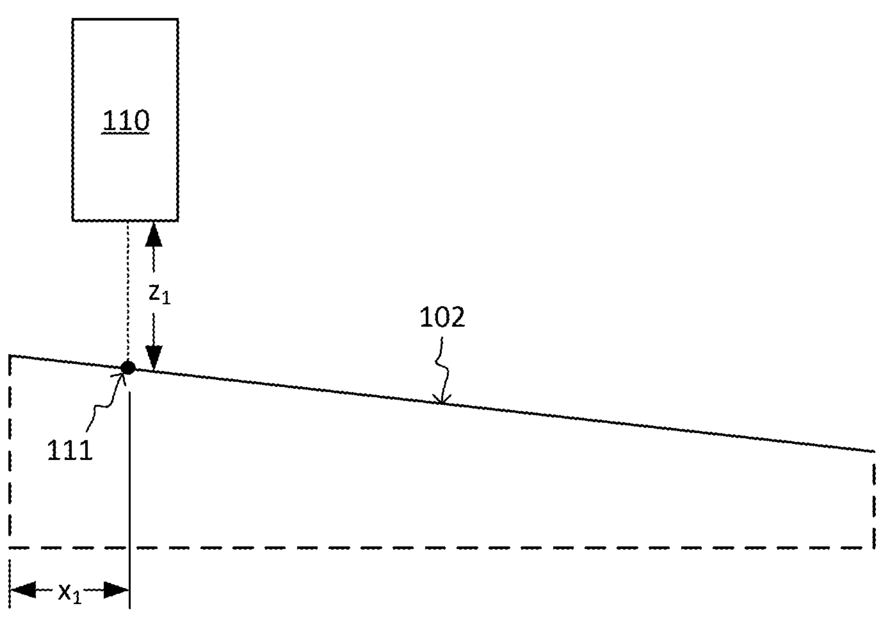
FIG. 5A is a side view of an optical detector measuring a depth of a first position on an inclined surface of a verification device according to an embodiment of the present disclosure.
Figure 5B:
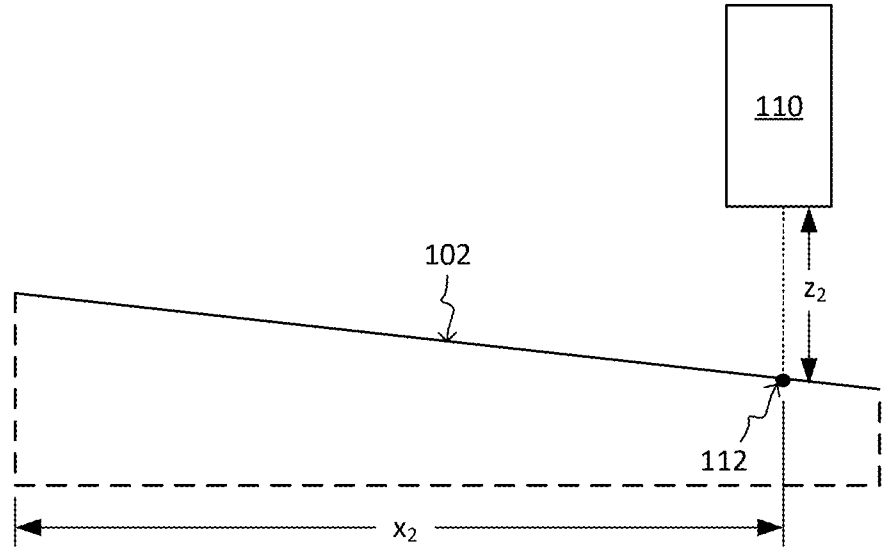
FIG. 5B is a side view of the optical detector measuring a depth of a second position on the inclined surface of the verification device of FIG. 5A.

The optical detector 110 may be configured to detect a relative depth between a first position 111 and a second position 112 on the inclined surface 102, as shown in FIG. 5A and FIG. 5B. The first position 111 and the second position 112 may be offset in the X-direction of the inclined surface 102 by a distance moved by the stage 7. The relative depth between the first planar surface 103 and the second planar surface 104 may be greater than the relative depth between the first position 111 and the second position 112 on the inclined surface 102. The controller 19 may be further configured to determine a slope of the inclined surface 102 based on the relative depth between the first position 111 and the second position 112 and the distance moved by the stage 7 from the first position 111 to the second position 112. For example, the controller 19 may be configured to determine the slope of the inclined surface 102 based on a formula of:

$$m = \frac{z_2 - z_1}{x_2 - x_1}$$

where m is the slope of the inclined surface 102, $z_1$ is a depth detected by the optical detector 110 at the first position 111, $x_1$ is a position of the stage 7 in the X-direction at the first position 111, $z_2$ is a depth detected by the optical detector 110 at the second position 112, and $x_2$ is a position of the stage 7 in the X-direction at the second position 112.

Figure 6:
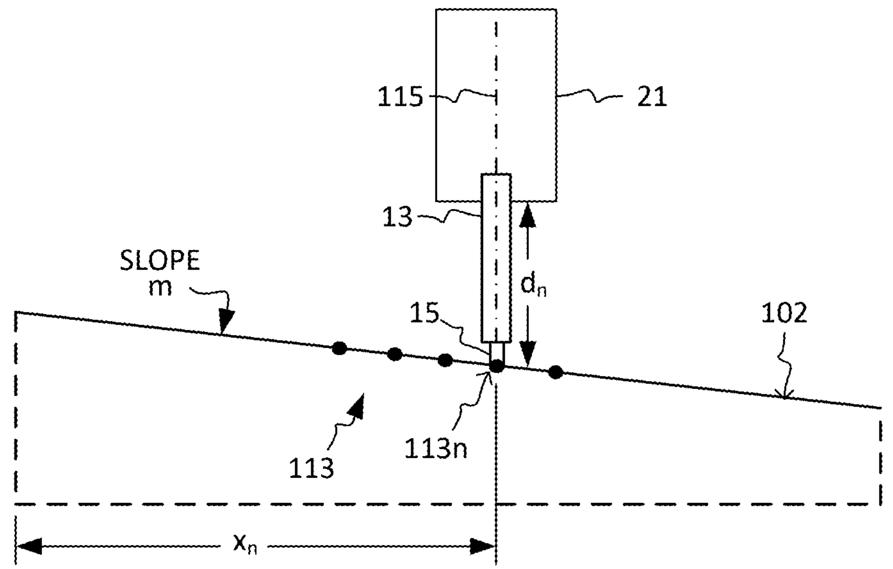
FIG. 6 is a side view of an indenter contacting an intermediate position on the inclined surface of the verification device of FIG. 5A.

The displacement detector 21 may be configured to detect a depth at which the surface 102 is detected by the punch 15 at a plurality of intermediate positions 113 on the inclined surface 102, as shown in FIG. 6. The plurality of intermediate positions 113 may be located between the first position 111 and the second position 112 in the X-direction. Between each of the intermediate positions 113, the punch 15 may retract and move in the X-direction to the next position. The controller 19 may be further configured to determine a calculated depth of the inclined surface 102 at each of the plurality of intermediate positions 113 based on the slope of the inclined surface 102 and the distance moved by the stage 7. For example, the controller 19 may be configured to determine the calculated depth of the inclined surface 102 at each of the plurality of intermediate positions 113 based on a formula of:

$$c_n = mx_n$$

where $c_n$ is the calculated depth of the inclined surface 102 at an nth one of the plurality of intermediate positions 113*n*, and $x_n$ is a position of the stage 7 in the X-direction at the nth one of the plurality of intermediate positions 113*n*. In some embodiments, the displacement detector 21 may be configured to detect a depth at which the punch 15 touches the test substrate 108 at the first position 111, the second position 112, and the plurality of intermediate positions 113 on the inclined surface 102.

The controller 19 may be further configured to compare the depth measured by the displacement detector 21 at each of the plurality of intermediate positions 113 to each corresponding calculated depth to verify accuracy of the displacement detector 21. For example, the controller 19 may be configured to compare the depth measured by the displacement detector 21 at each of the plurality of intermediate positions 113 to each corresponding calculated depth to verify the accuracy of the displacement detector 21 according to a formula of:

$$|c_n - d_n| \le t$$

where $d_n$ is a depth measured by the displacement detector 21 at the nth one of the plurality of intermediate positions 113*n*, and t is a preset error threshold. The preset error threshold may be set according to industrial standards (e.g., ISO 14577-2, ASTM 2546, or the like) as 1% of $c_n$. Systematic error in the measurement of lateral motion of the stage 7 may cancel out in the verification process, since the error would be present in the determination of the slope and in the plurality of intermediate positions 113 that define the test vector.

The controller 19 may be further configured to calibrate the signals received from the digital voltmeter 25 corresponding to the measured depths of the displacement detector 21 with their corresponding calculated depths. Accordingly, the system 100 can be calibrated to minimize any differences between the measured depths and the calculated depths.

With the system 100, the displacement measurement accuracy of the displacement detector 21 can be verified in a simple, reliable, and repeatable manner. In particular, using the geometry of the inclined surface 102 of the sample 101, the optical detector 110 can be used to independently verify displacement detector 21 measurements, without introducing additional sensors or hardware into the system 100.

Figure 7:
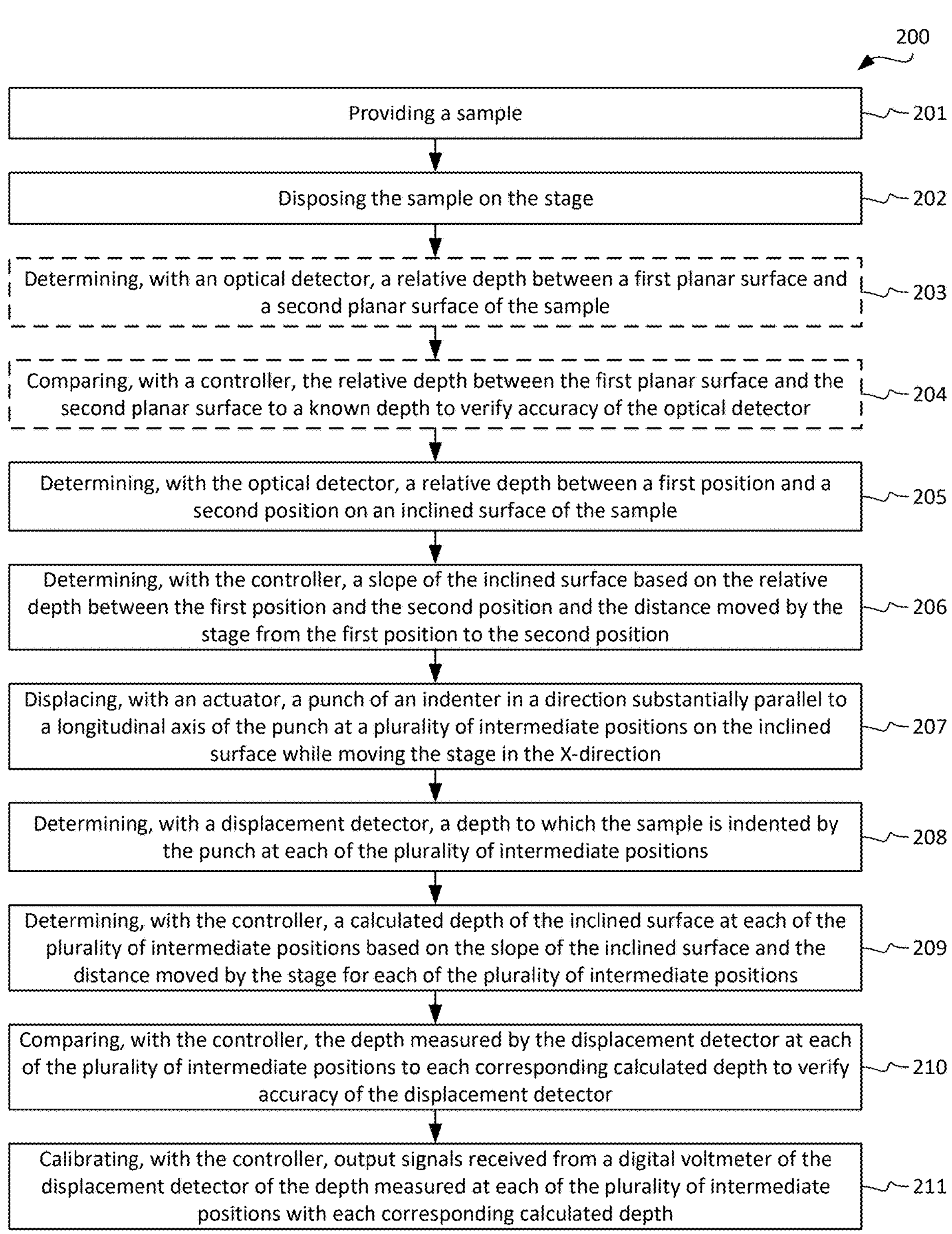
FIG. 7 is a flow chart of a method according to an embodiment of the present disclosure.

Another embodiment of the present disclosure provides a method 200. As shown in FIG. 7, the method 200 may comprise the following steps.

At step 201, a sample is provided. The sample have an inclined surface, a first planar surface, and a second planar surface.

At step 202, the sample is disposed on the stage. The sample may be supported by the stage and movable within an X-Y plane.

At step 203, an optical detector determines a relative depth between the first planar surface and the second planar surface of the sample. A longitudinal axis of an indenter may be normal to the first planar surface and the second planar surface, and the first planar surface and the second planar surface may have different relative depths along the longitudinal axis.

At step 204, a controller compares the relative depth between the first planar surface and the second planar surface to a known depth to verify accuracy of the optical detector.

In some embodiments, the accuracy of the optical detector may be pre-verified. Thus, the method 200 may skip steps 203 and 204.

At step 205, the optical detector determines a relative depth between a first position and a second position on the inclined surface of the sample. The inclined surface may be inclined in an X-direction of the X-Y plane, and the first position and the second position may be offset in the X-direction of the inclined surface by a distance moved by the stage.

At step 206, the controller determines a slope of the inclined surface based on the relative depth between the first position and the second position and the distance moved by the stage from the first position to the second position.

At step 207, an actuator displaces a punch of the indenter in a direction substantially parallel to the longitudinal axis of the punch at a plurality of intermediate positions on the inclined surface while moving the stage in the X-direction. The plurality of intermediate positions may be located between the first position and the second position in the X-direction.

At step 208 a displacement detector determines a depth at which the sample is touched by the punch at each of the plurality of intermediate positions.

At step 209, the controller determines a calculated depth of the inclined surface at each of the plurality of intermediate positions based on the slope of the inclined surface and the distance moved by the stage for each of the plurality of intermediate positions.

At step 210, the controller compares the depth measured by the displacement detector at each of the plurality of intermediate positions to each corresponding calculated depth to verify accuracy of the displacement detector.

At step 211, the controller calibrates output signals received from a digital voltmeter of the displacement detector of the depth measured at each of the plurality of intermediate positions with each corresponding calculated depth.

With the method 200, the displacement measurement accuracy of the displacement detector can be verified in a simple, reliable, and repeatable manner. In particular, using the geometry of the inclined surface of the sample, the optical detector can be used to independently verify displacement detector measurements, without introducing additional sensors or hardware into the system.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:

a stage configured to support a sample and move the sample within an X-Y plane;

an indenter including a punch having a longitudinal axis normal to the X-Y plane;

an actuator coupled to the stage and/or the indenter and configured to cause displacement of the punch relative to the stage in a direction substantially parallel to the longitudinal axis of the punch;

a force detector configured to output data representative of an applied force corresponding to mechanical response of the sample as a reaction to being contacted by the punch;

a displacement detector configured to output data representative of a depth at which the sample is touched by the punch;

an optical detector configured to output data representative of a relative depth between two or more positions of the sample; and a controller in electronic communication with the actuator, the force detector, the displacement detector, and the optical detector, the controller being configured to control the displacement of the punch relative to the stage and the force applied by the punch to the sample and receive the data output by the force detector, the displacement detector, and the optical detector;

wherein the sample includes an inclined surface, the inclined surface being inclined in an X-direction of the X-Y plane;

wherein the optical detector is configured to detect a relative depth between a first position and a second position on the inclined surface, the first position and the second position being offset in the X-direction of the inclined surface by a distance moved by the stage, and the controller is further configured to determine a slope of the inclined surface based on the relative depth between the first position and the second position and the distance moved by the stage from the first position to the second position;

wherein the displacement detector is configured to detect a depth at which the sample is touched by the punch at a plurality of intermediate positions on the inclined surface, the plurality of intermediate positions being located between the first position and the second position in the X-direction, and the controller is further configured to:

determine a calculated depth of the inclined surface at each of the plurality of intermediate positions based on the slope of the inclined surface and the distance moved by the stage; and compare the depth measured by the displacement detector at each of the plurality of intermediate positions to each corresponding calculated depth to verify accuracy of the displacement detector.

2. The system of claim 1, wherein the sample further includes a first planar surface and a second planar surface, the longitudinal axis of the indenter being normal to the first planar surface and the second planar surface, and the first planar surface and the second planar surface having different relative depths along the longitudinal axis;

wherein the optical detector is configured to detect a relative depth between the first planar surface and the second planar surface, and the controller is configured to compare the relative depth between the first planar surface and the second planar surface to a known depth to verify accuracy of the optical detector.

3. The system of claim 2, wherein the first planar surface is offset from the second planar surface in the X-direction of the X-Y plane.

4. The system of claim 2, wherein the inclined surface is offset from the first planar surface and the second planar surface in a Y-direction of the X-Y plane.

5. The system of claim 2, wherein the relative depth between the first planar surface and the second planar surface is in a range of 1 mm to 10 mm.

6. The system of claim 2, wherein the relative depth between the first planar surface and the second planar surface is greater than the relative depth between the first position and the second position on the inclined surface.

7. The system of claim 2, wherein a first reference substrate is disposed on the first planar surface and a second reference substrate is disposed on the second planar surface, and the optical detector is configured to detect the relative depth between the first reference substrate and the second reference substrate.

8. The system of claim 7, wherein the first reference substrate and the second reference substrate comprise silica disks.

9. The system of claim 2, wherein the controller is configured to compare the relative depth between the first planar surface and the second planar surface to the known depth to verify the accuracy of the optical detector based on a formula of:

$$|(z_{ref1} - z_{ref2}) - z_{known}| \leq t_{ref}$$

where $z_{ref1}$ is a depth of the first planar surface detected by the optical detector, $z_{ref2}$ is a depth of the second planar surface detected by the optical detector, $z_{known}$ is the known depth between the first planar surface and the second planar surface, and $t_{ref}$ is a preset reference threshold.

10. The system of claim 1, wherein a test substrate is disposed on the inclined surface, and the displacement detector is configured to detect a depth at which the test substrate is touched by the punch at the first position, the second position, and the plurality of intermediate positions on the inclined surface.

11. The system of claim 10, wherein the test substrate comprises a microscope slide.

12. The system of claim 1, wherein the slope of the inclined surface is in a range of 0.01 to 0.1.

13. The system of claim 1, wherein the controller is configured to determine the slope of the inclined surface based on a formula of:

$$m = \frac{z_2 - z_1}{x_2 - x_1}$$

where m is the slope of the inclined surface, $z_1$ is a depth detected by the optical detector at the first position, $x_1$ is a position of the stage in the X-direction at the first position, $z_2$ is a depth detected by the optical detector at the second position, and $x_2$ is a position of the stage in the X-direction at the second position.

14. The system of claim 13, wherein the controller is configured to determine the calculated depth of the inclined surface at each of the plurality of intermediate positions based on a formula of:

$$c_n = m x_n$$

where $c_n$ is the calculated depth of the inclined surface at an nth one of the plurality of intermediate positions, and $x_n$ is a position of the stage in the X-direction at the nth one of the plurality of intermediate positions.

15. The system of claim 14, wherein the controller is configured to compare the depth measured by the displacement detector at each of the plurality of intermediate positions to each corresponding calculated depth to verify the accuracy of the displacement detector according to a formula of:

$$|c_n - d_n| \leq t$$

where $d_n$ is a depth measured by the displacement detector at the nth one of the plurality of intermediate positions, and t is a preset error threshold.

16. The system of claim 1, wherein the optical detector comprises a laser interferometer.

17. A method comprising:

determining, with an optical detector, a relative depth between a first position and a second position on an inclined surface of a sample, the sample being supported by a stage and movable within an X-Y plane, the inclined surface being inclined in an X-direction of the X-Y plane, and the first position and the second position being offset in the X-direction of the inclined surface by a distance moved by the stage;

determining, with a controller, a slope of the inclined surface based on the relative depth between the first position and the second position and the distance moved by the stage from the first position to the second position;

displacing, with an actuator, a punch of an indenter in a direction substantially parallel to a longitudinal axis of the punch at a plurality of intermediate positions on the inclined surface while moving the stage in the X-direction, the longitudinal axis being normal to the X-Y plane, and the plurality of intermediate positions being located between the first position and the second position in the X-direction;

determining, with a displacement detector, a depth at which the sample is touched by the punch at each of the plurality of intermediate positions;

determining, with the controller, a calculated depth of the inclined surface at each of the plurality of intermediate positions based on the slope of the inclined surface and the distance moved by the stage for each of the plurality of intermediate positions; and comparing, with the controller, the depth measured by the displacement detector at each of the plurality of intermediate positions to each corresponding calculated depth to verify accuracy of the displacement detector.

18. The method of claim 17, wherein before determining, with the optical detector, the relative depth between the first position and the second position on the inclined surface of the sample, the method further comprises:

determining, with the optical detector, a relative depth between a first planar surface and a second planar surface of the sample, the longitudinal axis of the indenter being normal to the first planar surface and the second planar surface, the first planar surface and the second planar surface having different relative depths along the longitudinal axis; and comparing, with the controller, the relative depth between the first planar surface and the second planar surface to a known depth to verify accuracy of the optical detector.

19. The method of claim 17, wherein before determining, with the optical detector, the relative depth between the first position and the second position on the inclined surface of the sample, the method further comprises:

providing the sample; and disposing the sample on the stage.

20. The method of claim 17, further comprising:

calibrating, with the controller, output signals received from a digital voltmeter of the displacement detector of the depth measured at each of the plurality of intermediate positions with each corresponding calculated depth.

* * * * *